(12) United States Patent
Daul et al.

(10) Patent No.: US 11,679,532 B2
(45) Date of Patent: Jun. 20, 2023

(54) IN-MOLD COATING WITH IMPROVED FLOWABILITY

(71) Applicant: GM GLOBAL TECHNOLOGY OPERATIONS LLC, Detroit, MI (US)

(72) Inventors: Ronald C. Daul, Northville, MI (US); Yana Aliaj, Sterling Heights, MI (US); William R. Rodgers, Bloomfield Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 626 days.

(21) Appl. No.: 16/783,507

(22) Filed: Feb. 6, 2020

(65) Prior Publication Data

US 2021/0245405 A1 Aug. 12, 2021

(51) Int. Cl.
| | |
|---|---|
| *B29C 37/00* | (2006.01) |
| *C08F 283/01* | (2006.01) |
| *C08K 3/04* | (2006.01) |
| *C09D 167/06* | (2006.01) |
| *B29K 67/00* | (2006.01) |

(52) U.S. Cl.
CPC ........ *B29C 37/0028* (2013.01); *C08F 283/01* (2013.01); *C08K 3/042* (2017.05); *C09D 167/06* (2013.01); *B29K 2067/06* (2013.01); *C08K 2201/001* (2013.01)

(58) Field of Classification Search
None
See application file for complete search history.

(56) References Cited

U.S. PATENT DOCUMENTS

| | | |
|---|---|---|
| 6,843,945 B1 | 1/2005 | Lee et al. |
| 7,578,336 B2 | 8/2009 | Stahl et al. |
| 9,551,072 B2 | 1/2017 | Pawloski et al. |
| 2011/0250457 A1 | 10/2011 | Oota et al. |

(Continued)

FOREIGN PATENT DOCUMENTS

| | | |
|---|---|---|
| CN | 1678444 A | 10/2005 |
| CN | 104109450 A | 10/2014 |
| CN | 104974640 | 10/2015 |

(Continued)

OTHER PUBLICATIONS

First Office Action dated Jan. 5, 2022, in co-pending Chinese Application No. 202110158448.6, with correspondence dated Jan. 7, 2022, from China Patent Agent (H.K.) Ltd, summarizing contents; 9 pages.

(Continued)

*Primary Examiner* — Jeffrey D Washville
(74) *Attorney, Agent, or Firm* — Harness, Dickey & Pierce, P.L.C.

(57) ABSTRACT

An in-mold coating includes graphene and a base material including an unsaturated polyester and/or a vinyl ester monomer. A part includes a main body formed of a polymeric sheet molding compound and an in-mold coating disposed on the main body, where the in-mold coating includes graphene and a base material that comprises an unsaturated polyester and/or a vinyl ester monomer. A method of creating an in-mold coating includes providing a base material comprising at least one of an unsaturated polyester and a vinyl ester monomer, and the method further includes adding graphene to the base material.

13 Claims, 4 Drawing Sheets

(56) References Cited

U.S. PATENT DOCUMENTS

2020/0165410 A1* 5/2020 Kamar ................. C01B 32/198

FOREIGN PATENT DOCUMENTS

| CN | 109337534 A | 2/2019 |
| CN | 110423496 | 11/2019 |
| CN | 113214729 A | 8/2021 |
| DE | 102021101744 A1 | 8/2021 |
| EP | 2548657 A1 | 1/2013 |
| GB | 1590255 A | 5/1981 |
| WO | WO-2014070346 A1 | 5/2014 |
| WO | 2019028199 | 2/2019 |
| WO | WO-2019157291 A1 | 8/2019 |

OTHER PUBLICATIONS

First Office Action dated May 6, 2022, in co-pending German Application No. 102021101744, with correspondence dated May 12, 2022, from Manitz Finsterwald summarizing contents; 4 pages.

* cited by examiner

IN-MOLD COATING WITH IMPROVED FLOWABILITY

FIELD

The disclosure relates to an in-mold coating designed to be used within a mold to coat another component.

INTRODUCTION

In-mold coatings are coatings that are applied to an article, typically when the article is within the mold that creates it. The in-mold coating is a mixture of polymer precursors, which, when catalyzed, cross-link to form a durable, conductive, primer coating on the surface of the molded part. In-mold coatings may have several benefits, one of which is to seal the part, as the part may be molded from a more porous material than the material of the in-mold coating. In the automotive field, exterior parts formed of a polymeric material may have an in-mold coating applied to the base part to provide sealing, scratch resistance, weathering resistance, adhesion of additional paint layers, and/or other benefits.

Some automobiles may have large exterior parts, such as hoods, hatches, and door panels, that are difficult to uniformly coat within the mold of the part. This is because the in-mold coating begins to cure before flowing over the entire large part. Accordingly, there is a need for an in-mold coating, or a method of providing similar benefits as in-mold coatings, for use with large exterior parts.

SUMMARY

The present disclosure provides an in-mold coating with improved flowability, which is capable of coating a large part within a mold. The new in-mold coating includes graphene within a polymeric base material, which may provide for lower viscosity under shear, increased flowability (enhanced shear thinning), improved durability (increase in mechanical properties), improved surface appearance (less air entrapment at end of flow, increased length of flow, and better appearance of knit lines), and conductivity.

In one example, which may be combined with or separate from other examples provided herein, an in-mold coating includes graphene and a base material comprising an unsaturated polyester and/or a vinyl ester monomer.

In another example, which may be combined with or separate from the other examples provided herein, a part is provided that includes a main body formed of a polymeric sheet molding compound and an in-mold coating disposed on the main body. The in-mold coating includes graphene and a base material that comprises an unsaturated polyester and/or a vinyl ester monomer.

In yet another example, which may be combined with or separate from the other examples provided herein, a method of creating an in-mold coating is provided. The method includes providing a base material comprising at least one of an unsaturated polyester and a vinyl ester monomer. The method further includes adding graphene to the base material.

Additional features may optionally be provided, including but not limited to the following: the graphene being provided in an amount of 0.1 to 10 weight percent of the in-mold coating; the graphene being provided in an amount of 0.2 to 5 weight percent of the in-mold coating; the graphene being provided in an amount of 0.3 to 1 weight percent of the in-mold coating; the graphene being provided as at least one layer of exfoliated graphene; the graphene being provided as a plurality of attached together layers of graphene; wherein the plurality of attached together layers includes two to fifteen layers; the graphene being dispersed within the base material; the base material comprising both the unsaturated polyester and the vinyl ester monomer; the base material further comprising a styrene and/or a substituted acrylate monomer; the in-mold coating being free of carbon black; the in-mold coating further comprising conductive carbon black; the conductive carbon black being provided in an amount not exceeding 3 weight percent of the in-mold coating; a paint coating disposed on the in-molding coating; shear mixing the base material and the graphene to disperse the graphene throughout the base material, thereby forming a mixture of the base material and the graphene; exfoliating the graphene into graphene compounds comprising between one and fifteen layers of graphene prior to adding the graphene to the base material; and adding a catalyst to the mixture of the base material and the graphene.

The above features and advantages and other features and advantages of the present disclosure will be readily apparent from the following detailed description when taken in connection with the accompanying drawings and appended claims.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of this disclosure. In the drawings.

DETAILED DESCRIPTION

The following description is merely exemplary in nature and is not intended to limit the present disclosure or its application or uses.

Figure 1:
FIG. 1 is a perspective view of a vehicle, in accordance with the principles of the present disclosure.

Referring to the drawings, wherein like reference numerals refer to like elements, FIG. 1 shows a vehicle 10 that includes a number of large exterior parts 12, 14, 16. For example, the vehicle includes a hood 12, a door 14, and a hatch 16, which may each be formed of a composite polymeric sheet molding compound (SMC).

Figure 2:
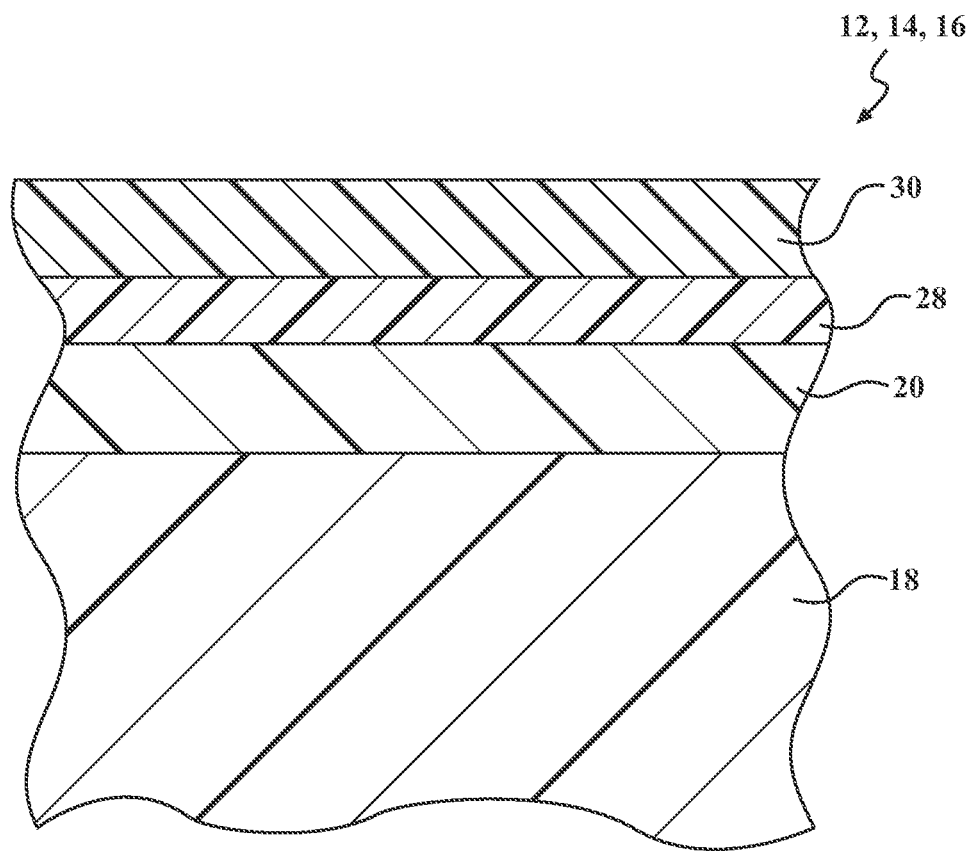
FIG. 2 is a schematic cross-sectional view of a portion of a part of the vehicle of FIG. 1, according to the principles of the present disclosure.

Referring now to FIG. 2, with continued reference to FIG. 1, the main body 18 of each part 12, 14, 16 is formed of the SMC material. The SMC material may be a fiber-reinforced polymeric material. It is desirable to form the hood 12, door(s) 14, and hatch 16, as well as other exterior parts, out of polymeric materials because, compared to sheet metal, they have a higher strength to weight ratio, are better able to resist corrosion and deterioration from weathering, and have more design flexibility.

Sheet molding compound (SMC) is a commonly used ready-to-mold, fiber-reinforced polymeric material. SMC may be prepared by dispensing an amount of cut fibers onto a thermosetting resin precursor composition that is carried on a film (usually of nylon or polyethylene). The fibers then disperse into and through the resin composition, and another sheet of film is placed on top of the fiber-resin mixture to sandwich them together and form a contained layer (or package) of SMC composite material. These packages are coiled on a take-up roll and stored to age, or mature, for a time suitable for the viscosity of the composite to reach a level sufficient for molding, typically between two to five days. When the SMC is ready to mold, molding charges are selected or cut from the aged packages and placed between facing, complementary, heated steel dies. Heat and pressure act on each charge to shape and cure it—to activate the polymerization of the thermosetting resin—resulting in solidification of the polymeric material and the formation of a molded SMC article.

In some examples, the SMC may include a thermoplastic, such as polyvinyl chloride, polyvinylidene chloride, polyvinyl acetate, polyvinyl alcohol, polystyrene, acrylonitrile-styrene polymer, acrylonitrile-butadiene-styrene resin, polyacrylate resin, polymethacrylate, methacrylate monomer or poly methyl methacrylate, styrene monomer or polystyrene, polyethylene, including ultra-high molecular weight polyethylene (UHMWPE), medium-density polyethylene (MDPE), low-density polyethylene (LDPE), polypropylene, thermoplastic olefin resins, caprolactam monomer or polyamide (PA46, PA6, PA66, PA6/66, PA11, PA12, PA610), fully or partially aromatic polyamide resins, polyacetal resin, polybenzimidazole, polycarbonate, polyethylene terephthalate, polyethylene naphthalate, polybutylene terephthalate, polyphenyl ethers, polyphenylene oxides, polyphenylene sulfide, polyethersulfones, polyetherether ketones, polyether ketones, polyetherimides, polylactides, polyoxymethylenes, thermoplastic polyurethanes, or any combination or copolymer of these resins.

In some examples, the SMC may also or alternatively include a thermoset material, such as benzoxazine, bis-maleimide (BMI), cyanate ester polymers, epoxy, phenolic (PF), polyacrylate (acrylic), polyimide (PI), unsaturated polyester, polyurethane (PUR), vinyl ester, siloxane, polydicyclopentadiene (PDCPD), co-polymers thereof, and combinations thereof.

The SMC may also include a reinforcing filler. In some examples, fibers may be used as the reinforcing filler, such as carbon fibers, glass fibers (e.g., fiber glass, quartz), basalt fibers, aramid fibers (e.g., those sold under the trademark KEVLAR®, polyphenylene benzobisoxazole (PBO), and para-aramid synthetic fibers sold under the trademark TWARON™), polyethylene fibers (e.g., ultra-high molecular weight polyethylene (UHMWPE)), polypropylene fibers (e.g., high-strength polypropylene), boron fibers, ceramic fibers, polyester fibers, natural fibers (e.g., cellulose, cotton, flax, hemp, spider silk, etc.), and combinations thereof. Particulate fillers may also or alternatively be used, including but not limited to mineral fillers such as calcium carbonate, talc, silica, wollastonite, clay (varieties of which include kaolin smectite, hectorite, montmorillonite, bentonite, beidellite, saponite, stevensite, sauconite, nontronite, illite, halloysites, and/or mixtures thereof), calcium sulfate, carbon black, mica, glass platelets, hollow glass spheres, alumina trihydrate, magnesium hydroxide, titanium dioxide, and combinations thereof.

A representative SMC resin precursor composition consists of approximately (on a fiber-free basis) 16.9 weight percent thermosetting resin, 2.6 weight percent styrene monomer, 13 weight percent low profile additive, 65 weight percent filler, for example, calcium carbonate, 1.5 weight percent thickener, 0.7 weight percent mold release agent, and 0.3 weight percent polymerization initiator. Reinforcing fibers comprise approximately 27 weight percent of the final SMC composite.

Another representative SMC is shown in Table 1.

TABLE 1

Medium Density SMC formulation

| Material Class | Component | Amount (% by weight) |
|---|---|---|
| Resin | Unsaturated Polyester Resin containing 37% Styrene Monomer | 12.21 |
| | Polyvinyl Acetate | 9.40 |
| | Styrene Monomer | 1.88 |
| Initiator | t-butyl peroxybenzoate peroxide | 0.12 |
| Inhibitor | p-benzo quinone | 0.12 |
| Internal Lubricant | Zinc Stearate | 0.24 |
| Viscosity Reducer | Fatty Acid Mixture | 0.71 |
| Thickening Agent | Magnesium oxide dispersed in polyester | 0.82 |
| Mineral Filler | Calcium Carbonate | 47.00 |
| Reinforcing Filler | Glass Fiber | 27.50 |

To seal the part 12, 14, 16 and to provide the benefits, such as those mentioned above, an in-mold coating 20 is disposed on the main body 18 of the part 12, 14, 16. The in-mold coating 20 may have a thickness, for example, in the range of 2 to 5 mils, or thousandths of an inch. (In the metric system, this is 50.8 to 127 microns). Referring now to FIGS. 2-5, the in-mold coating 20 comprising graphene 22 and a base material 24 that comprises at least one of an unsaturated polyester and a vinyl ester monomer. The base material 24 may also include other thermoplastics and/or thermoset materials, such as those described above.

Figure 3:
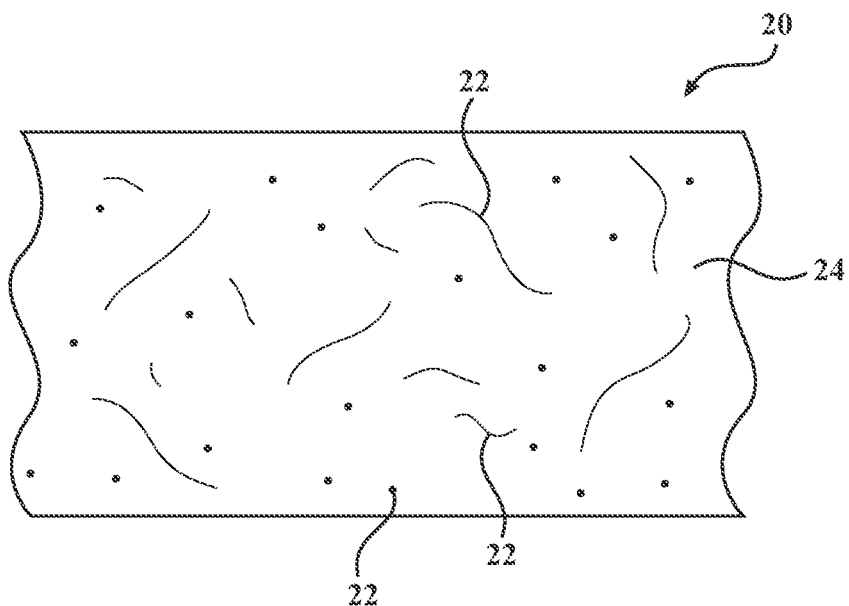
FIG. 3 is a close-up schematic cross-sectional view of an in-mold coating of the part of FIGS. 1 and 2, in accordance with the principles of the present disclosure.
Figure 4:
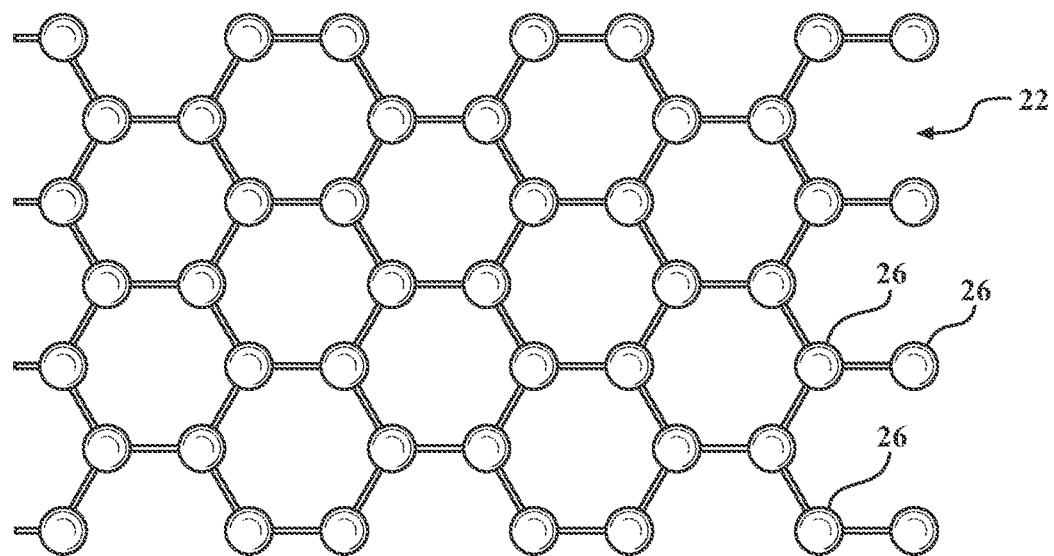
FIG. 4 is a diagrammatic view of a single graphene sheet that may form a portion of the in-mold coating of FIG. 3, according to the principles of the present disclosure.
Figure 5:
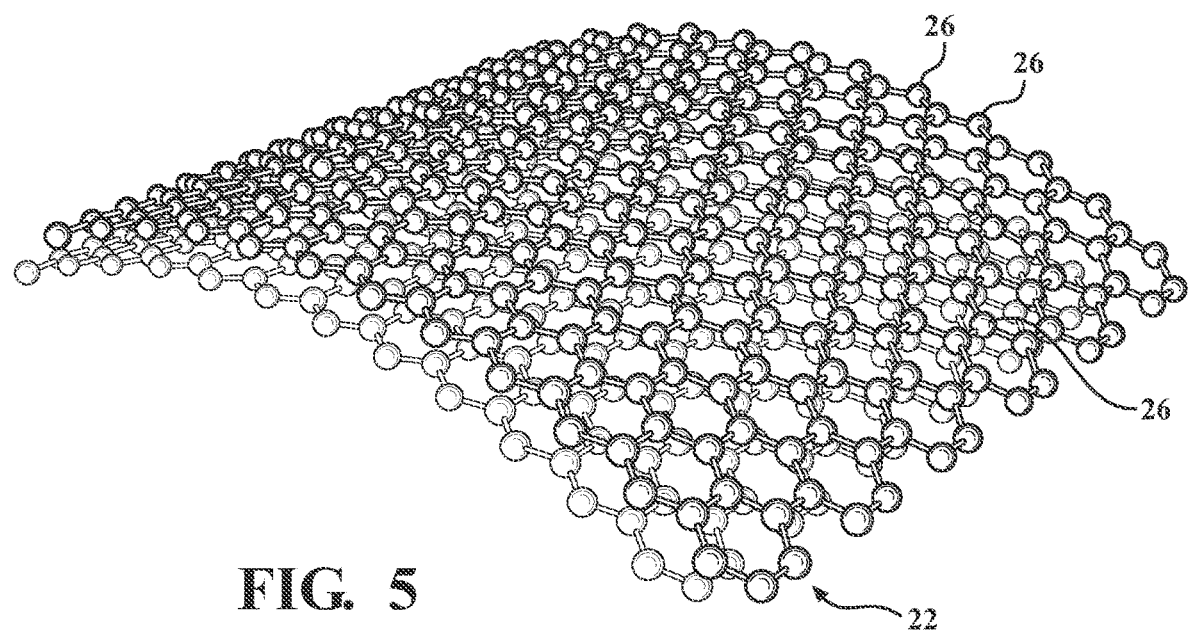
FIG. 5 is a diagrammatic view of a multi-layer graphene compound that may form a portion of the in-mold coating of FIG. 3, according to the principles of the present disclosure.

Graphene 22 is an allotrope of carbon in the form of a layer or layers of atoms 26 arranged in a two-dimensional hexagonal lattice. Graphene 22 can be considered an infinite aromatic molecule. The graphene 22 provided in the in-mold coating 20 may be exfoliated into a single layer as shown in FIG. 4, or the graphene 22 may be provided as multiple attached together layers of graphene 22, as shown in FIG. 5. For example, the multi-layer graphene 22 may include two to fifteen layers. Various sizes of lattice networks of graphene 22 are dispersed within and throughout the base material 24, as shown in FIG. 3.

In some examples, the base material 24 of the in-mold coating 20 includes both an unsaturated polyester and a vinyl ester monomer. The base material 20 may further include a styrene and/or a substituted acrylate monomer. In some variations, the in-mold coating 20 may be free of carbon black, as the graphene 22 acts to increase the conductivity of the in-mold coating 20. In other variations, some carbon black may be mixed into the in-mold coating 20, but the graphene 22 provides conductivity so that less carbon black is needed than would otherwise be needed if no graphene 22 were included. In some example, conductive carbon black is provided in an amount of 3 weight percent or less of the in-mold coating 20.

The graphene 22 may be provided in an amount of 0.1 to 10 weight percent of the in-mold coating 20. More preferably, the graphene 22 is provided in an amount of 0.2 to 5 weight percent of the in-mold coating 20. Even more preferably, the graphene 22 is provided in a range of 0.3 to 1 weight percent of the in-mold coating 20.

One example of an in-mold coating 20 is shown in Table 2.

TABLE 2

Exemplary In-Mold Coating Prior to Adding Graphene

| Material Class | Material | Amount (% by weight) |
| --- | --- | --- |
| Resin | Styrene | 25 |
|  | Ethoxylated Bisphenol A Diacrylate | 37 |
| Mineral Filler | Talc | 10 |
|  | Barium Sulfate | 10 |
| Conductive Filler | Carbon Black | 3 |
| Solvents | Dimethyl Adipate | 12 |
|  | Dimethyl Succinate | 3 |

The viscosity of the in-mold coating 20 is adjusted through the addition of non-reactive solvents, such as those shown in Table 2. A desired viscosity may be, for example, 3000-6000 mPa-s. Before use, in one example, the in-mold coating 20 may be catalyzed with 0.8 to 1.5 weight percent, e.g. about 1 weight percent, t-Butyl Peroxybenzoate or a different alternative free radical producing initiator such as Benzoil Peroxide, Azobisisobutyronitrile, Dicumyl Peroxide, or di-tert-butyl peroxide.

One or more paint layers 28 and/or gloss layers 30 may be applied over the in-mold coating 20, as shown in FIG. 2. For example, when the in-mold coating 20 coats an exterior vehicle part 12, 14, 16, paint/gloss layers 28, 30 are applied over the in-mold coating 20. Though not shown, more than two paint/gloss layers 28, 30 may be included to provide for a glossy, finished part 12, 14, 16. In some examples, the additional layers 28, 30 may include a first primer, a second primer, a base paint coat, a top paint coat, and/or any other desired layers of paint, coating, or gloss. In other variations, some parts may be sold without any coatings 28, 30 applied over the in-mold coating 20.

In other examples, the in-mold coating 20 may be provided without the automotive part 12, 14, 16. For example, the in-mold coating 20 may be applied over another substrate, where the other type of substrate may be formed of any of the materials mentioned above.

Figure 6:
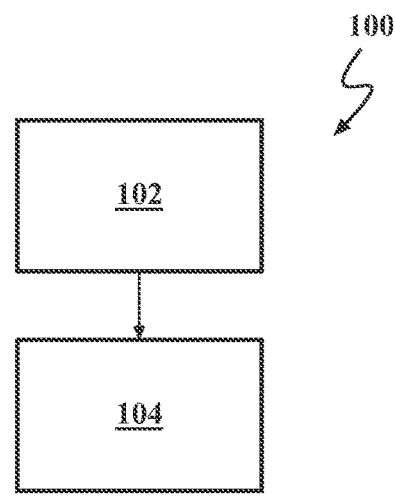
FIG. 6 is a block diagram illustrating a method of forming an in-mold coating, in accordance with the principles of the present disclosure.

Referring now to FIG. 6, a method of creating an in-mold coating 20 is provided and generally designated at 100. The method 100 includes a step 102 of providing a base material 24 comprising at least one of an unsaturated polyester and a vinyl ester monomer. The method 100 further includes a step 104 of adding graphene 22 to the base material 24.

Figure 7:
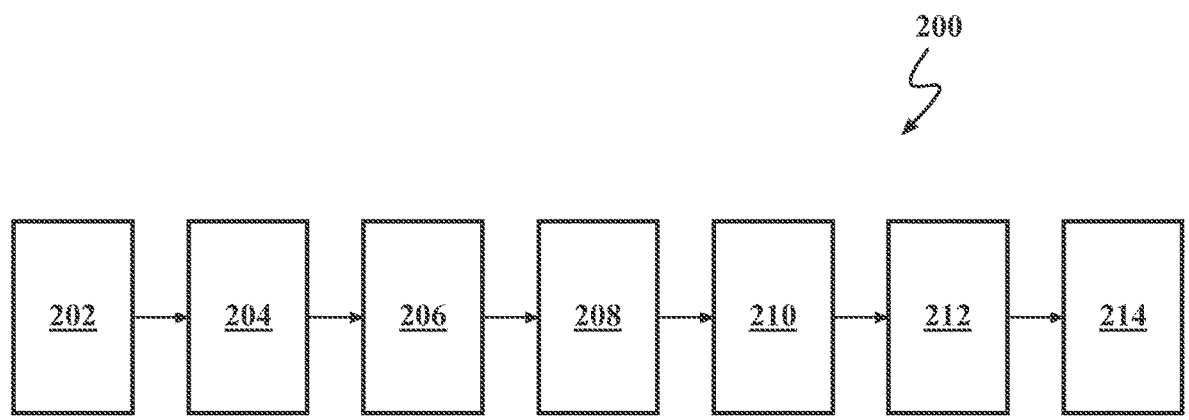
FIG. 7 is a block diagram illustrating a method of forming an in-mold coating and a part having the in-mold coating disposed thereon, according to the principles of the present disclosure.

Referring now to FIG. 7, a more detailed method of creating an in-mold coating 20 is provided and generally designated at 200. The method 200 includes optional steps that are not necessarily required for the method 100 of FIG. 6, but one or more of which may be included in the method 100 of FIG. 6.

The method 200 includes a step 202 of preparing a base material, which may be an in-mold coating resin blend as described above with respect to base material 24 described above. The method 200 then includes a step 204 of adding graphene 22 to the base material 24. The method 200 may include exfoliating the graphene 22 into graphene compounds comprising between one and fifteen layers of graphene 22 prior to adding the graphene 22 to the base material 24, or the graphene 22 may be purchased with the desired amount of thickness or exfoliation. The graphene 22 may be provided in the amounts described above, such as 0.1 to 10 weight percent, 0.2 to 5 weight percent, or 0.3 to 1 weight percent of the in-mold coating 20, as desired.

The step 204 of adding the graphene 22 to the base material 24 may include high shear mixing the base material 24 and the graphene 22 to disperse the graphene 22 throughout the base material 24, thereby forming a mixture of the base material 24 and the graphene 22. In other alternatives, the graphene 22 may be added to the base material 24 using ultrasonification, sand milling, basket milling, three roll milling, ball milling, or another appropriate mixing technique. In some cases the graphene may be provided as a predispersed material concentrate in one of the other components of the base material. This may provide for easier incorporation and dispersal of the graphene into the base materials. Concentrations of the graphene in such concentrates may be between 10%-50% by weight, between 15%-30% by weight, or alternatively, between 20% and 25% by weight of the base resin component. This graphene concentrate would then be incorporated using the same methods as if the dry graphene were being incorporated.

The method 200 may include a step 206 of adding conductive carbon black to the mixture of graphene 22 and base material 24 to tailor the conductivity and flowability of the mixture of the in-mold coating 20, as desired. In step 208, the in-mold coating 20 is then provided to a molder.

In a step 210, the method 200 includes adding a catalyst to the in-mold coating mixture 20. High shear mixing may be used to add the catalyst. In some variations, the method 200 may include keeping the in-mold coating 20 mixing until ready to be introduced into a mold; or in the alternative, continuous mixing need not be used, and the in-mold coating 20 may be stored until use.

In step 212, the method 200 includes injecting the in-mold coating 20 into a mold having an unfinished part 12, 14, 16, and closing the tool to provide additional shear flow and allow the coating 20 to cross-link. The method 200 may then include a step 214 of ejecting the coated part 12, 14, 16. The part 12, 14, 16 with the in-mold coating 20 may then have paint and/or gloss layers 28, 30 applied to it, or such layers 28, 30 may be applied after the parts 12, 14, 16 are assembled with the rest of the vehicle 10.

Accordingly, the in-mold coating 20 provides a sealer for the porous SMC parts 12, 14, 16, as well as a conductive surface that provides for good application of the paint and gloss layers 28, 30. The graphene 22 interspersed within the base material 24 of the in-mold coating 20 may provide for improved flowability, durability, surface appearance, and conductivity. By virtue of the graphene 22 being added to the in-mold coating base material 24, the resultant in-mold coating 20 becomes thixotropic (shear thinning). The in-mold coating 20 containing graphene 22 is able to flow and cover the entire part 12, 14, 16 during the coating process due to the increased flowability under the influence of shear, so that the entire part 12, 14, 16 is covered prior to the hardening of the coating 20. Accordingly, even large parts such as the hood 12, door(s) 14, and hatch 16 can be covered by the in-mold coating 20 prior to the in-mold coating 20 hardening or curing within the mold.

The description of the disclosure is merely exemplary in nature and variations that do not depart from the gist are intended to be within the scope of the present disclosure. Such variations are not to be regarded as a departure from the spirit and scope of the present disclosure.

What is claimed is:

1. A part comprising:
a main body formed of a polymeric sheet molding compound;
an in-mold coating disposed on the main body, the in-mold coating comprising graphene and a base material that comprises at least one of an unsaturated polyester and a vinyl ester monomer, the graphene consisting of conductive carbon and being provided in an amount of 0.3 to 1 weight percent of the in-mold coating; and
a paint coating disposed on the in-molding coating, wherein the graphene in the in-molding coating provides the main body with a conductive surface for application of the paint coating.

2. The part of claim 1, wherein the graphene comprises a single layer of exfoliated graphene.

3. The part of claim 1, wherein the base material comprises both the unsaturated polyester and the vinyl ester monomer, and wherein the base material further comprises a styrene and a substituted acrylate monomer.

4. A method of creating an in-mold coating on a body formed of a composite polymeric sheet molding compound, the method comprising:
providing a base material comprising at least one of an unsaturated polyester and a vinyl ester monomer;
adding graphene to the base material to form the in-mold coating, the graphene consisting of conductive carbon and being provided in an amount of 0.3 to 1 weight percent of the in-mold coating;
applying the in-mold coating to the body; and
applying a paint coating over the in-molding coating, wherein the graphene in the in-molding coating provides the body with a conductive surface for application of the paint coating.

5. The method of claim 4, further comprising shear mixing the base material and the graphene to disperse the graphene throughout the base material, thereby forming a mixture of the base material and the graphene.

6. The method of claim 5, further comprising exfoliating the graphene into graphene compounds comprising between one and fifteen layers of graphene prior to adding the graphene to the base material.

7. The method of claim 6, further comprising:
adding a catalyst to the mixture of the base material and the graphene.

8. The part of claim 1, wherein the in-mold coating has a thickness in a range of 50.8 micrometers to 127 micrometers.

9. The part of claim 1, wherein the graphene consists of at least one layer of carbon atoms arranged in a two-dimensional hexagonal lattice.

10. The part of claim 9, wherein the graphene consists of two to fifteen attached layers of graphene.

11. The part of claim 1, wherein the graphene is dispersed within and throughout the base material.

12. The part of claim 1, wherein the in-mold coating is free of carbon black.

13. The part of claim 1, wherein the in-mold coating further comprises conductive carbon black in an amount not exceeding 3 weight percent of the in-mold coating.

* * * * *